(12) United States Patent
Moore

(10) Patent No.: US 11,060,554 B2
(45) Date of Patent: Jul. 13, 2021

(54) FASTENER ASSEMBLY AND METHOD

(71) Applicant: Ankara Industries, Inc., Chesterfield, MI (US)

(72) Inventor: Richard E. Moore, Grosse Pointe Park, MI (US)

(73) Assignee: ANKARA INDUSTRIES, INC., Chesterfield, MI (US)

( * ) Notice: Subject to any disclaimer, the term of this patent is extended or adjusted under 35 U.S.C. 154(b) by 285 days.

(21) Appl. No.: 16/267,749

(22) Filed: Feb. 5, 2019

(65) Prior Publication Data

US 2019/0242426 A1 Aug. 8, 2019

Related U.S. Application Data

(60) Provisional application No. 62/626,363, filed on Feb. 5, 2018.

(51) Int. Cl.
*F16B 43/00* (2006.01)
*B21H 3/04* (2006.01)
*F16B 4/00* (2006.01)
*F16B 35/04* (2006.01)

(52) U.S. Cl.
CPC ............ *F16B 43/00* (2013.01); *B21H 3/04* (2013.01); *F16B 4/004* (2013.01); *F16B 35/048* (2013.01)

(58) Field of Classification Search
CPC .......... F16B 4/004; F16B 23/00; F16B 33/00; F16B 35/048; F16B 35/06; F16B 43/00; B21H 3/04

USPC ..... 411/366.1, 368, 370, 401–402, 411, 424, 411/531, 533

See application file for complete search history.

(56) References Cited

U.S. PATENT DOCUMENTS

| | | | | |
|---|---|---|---|---|
| 121,060 | A * | 11/1871 | Mutimer | F16B 4/004 411/424 |
| 1,020,839 | A * | 3/1912 | Niesen | F16L 27/0849 285/184 |
| 1,960,734 | A * | 5/1934 | Fassinger | F16B 4/004 411/424 |
| 2,672,069 | A * | 3/1954 | Mitchell | F16B 43/00 411/368 |
| 3,032,281 | A * | 5/1962 | Wexell | B27L 11/005 241/92 |
| 3,418,012 | A * | 12/1968 | La Torre | F16B 19/02 403/408.1 |
| 3,993,397 | A * | 11/1976 | Gutshall | F16B 39/24 439/433 |
| 4,621,963 | A * | 11/1986 | Reinwall | F16B 5/0275 411/369 |
| 5,308,285 | A * | 5/1994 | Malen | B21H 3/02 411/368 |
| 6,082,942 | A * | 7/2000 | Swick | H01R 4/304 411/160 |
| 7,814,735 | B2 * | 10/2010 | Neudorf | F16B 35/041 56/1 |

* cited by examiner

*Primary Examiner* — Roberta S Delisle
(74) *Attorney, Agent, or Firm* — Reising Ethington P.C.

(57) ABSTRACT

A fastener with a body with a shank, a head adjacent one end of and integral with the shank, and a shoulder adjacent the head, and a separate washer with a through hole received on the shank, bearing on the shoulder and securely fastened to the shank. The body and washer may have an interference fit. The body may be made and the washer attached by cold forming the body with a ring bearing on the washer.

20 Claims, 3 Drawing Sheets

FASTENER ASSEMBLY AND METHOD

This application claims priority to U.S. Provisional Application No. 62/626,363 filed Feb. 5, 2018, which is incorporated herein by reference in its entirety.

TECHNICAL FIELD

The present invention relates generally to fasteners and more particularly to a threaded fastener and washer assembly and a method of making this assembly.

BACKGROUND

Many conventional fasteners have a machine bolt with a threaded shank and at one end a non-circular head engageable by a socket or tool or a circular head with a slot or recess therein for receiving a tool for rotating or holding the bolt, a separate washer removably and slidably received over the threaded shank to bear on an adjacent face of the head and a complimentary nut removably and threadably received on the threaded shank. Other fasteners may have the washer rotatably retained on the shank so that the head and shank may be rotated relative to the washer.

SUMMARY

In at least some implementations, a fastener may include a body with a shank, a head adjacent one end of and integral with the shank and a shoulder on the shank and spaced from the head, and a separate washer with a through hole and received on the shank, bearing on the shoulder and fastened to the shank.

In at least some implementations the washer and shank may be made of a ductile metal and the shank may have a plurality of circumferentially spaced apart protuberances adjacent the shoulder and the washer is received over the protuberances with a press or interference fit to attach to it the shank. In at least some implementations, the shank may include recesses between the protuberances.

In at least some implementations, the washer may be secured to the shank by a ring integral with the shank, spaced from the shoulder, and bearing on the washer with an outside diameter greater than the diameter of the hole through the washer. In at least some implementations, the ring may be roll formed on the shank.

In at least some implementations, the shank may include threads and the threads may be roll formed.

In at least some implementations, a fastener may be made by cold forming a body with a shank, an integral head, shoulder portion and spaced apart protuberances on the shoulder with recesses between them, providing a washer with a through hole, and press fitting with an interference fit the washer onto the protuberances and into engagement with the shoulder to securely fasten the washer on the body. If desired, threads may be cold formed on the shank.

In at least some implementations a fastener may be made by cold forming a body with a shank, a head, a shoulder and a cylindrical portion, providing a washer with a through hole, slidably disposing the washer on the cylindrical portion and engaging the shoulder, and cold forming on the cylindrical portion a ring spaced from the shoulder and bearing on and overlapping the washer to securely fasten it to the shank and bearing on the shoulder. In at least some implementations, threads may also be cold formed on the sank and desirably cold rolled substantially simultaneously with cold rolling the ring.

BRIEF DESCRIPTION OF THE DRAWINGS

The following detailed description of certain embodiments of the best mode of the fastener assembly and method will be set forth with reference to the accompanying drawings in which.

DETAILED DESCRIPTION

Figure 1:
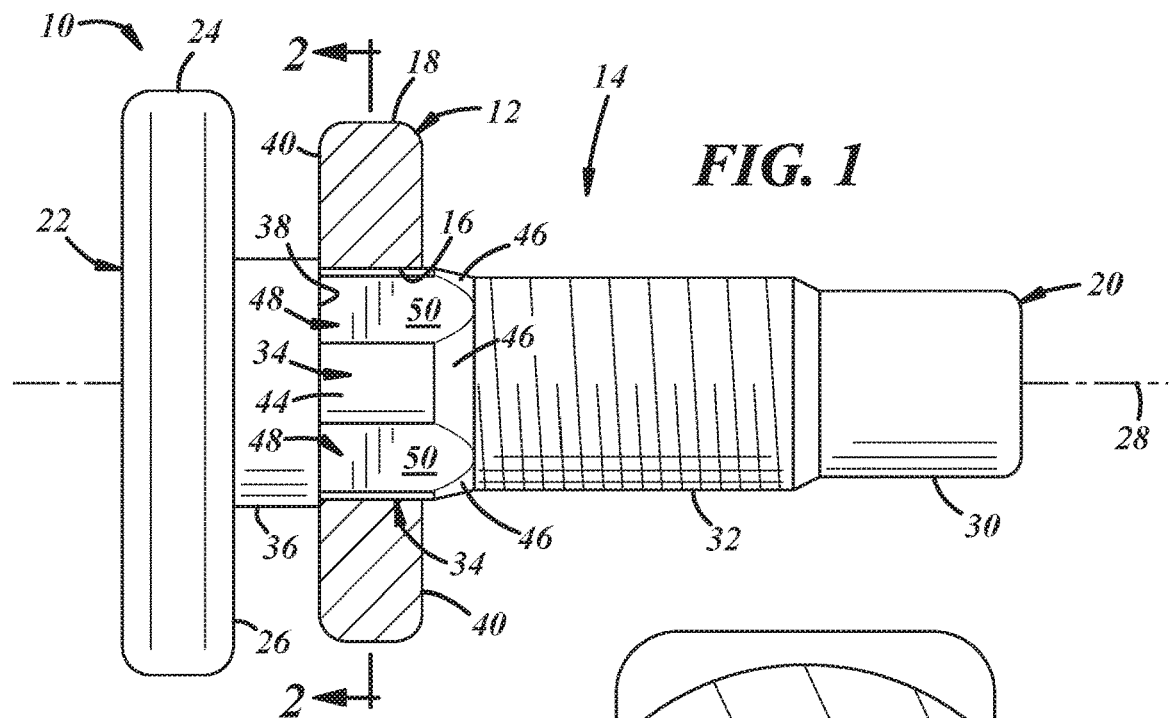
FIG. 1 is a side view of a fastener assembly embodying this invention with a body and a washer shown in section and fixed to the body.

FIG. 1 illustrates a fastener assembly 10 embodying this invention with a washer 12 fixed or fastened securely on a body 14. The washer 12 may have a round cylindrical through hole 16 and an outer periphery 18 which may be non-circular such as rectangular or hexagonal, or circular in configuration (as shown) depending on the nature of the part or component with which the fastener assembly 10 will be used.

Figure 2:
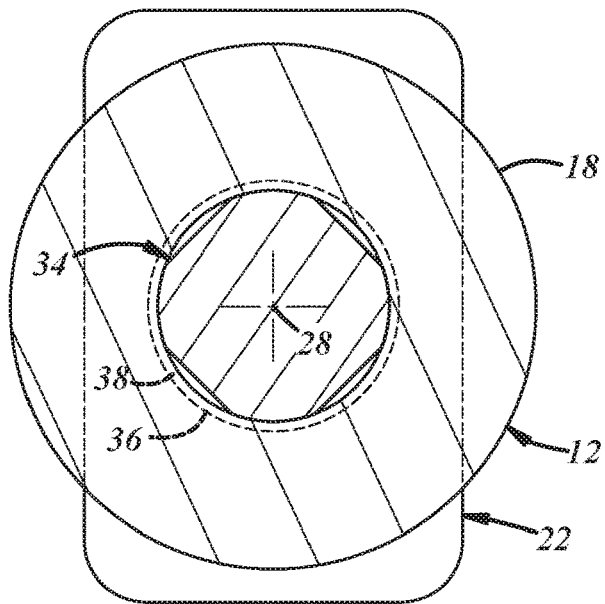
FIG. 2 is a sectional view taken of line 2-2 of FIG. 1.

As shown in FIGS. 1 and 2, the body 14 may have a shank 20 with an integral head 22 with a rectangular or other non-circular periphery configured to engage a component and/or for engagement by a tool to rotate or hold the fastener assembly, and an inner face 26 which may be planar and perpendicular to a longitudinal axis 28 of the shank. The shank 20 may have a cylindrical pilot portion 30 with a first diameter, a threaded portion 32 with a second diameter which may be larger than the first diameter, a plurality of circumferentially spaced apart ribs or protuberances 34 onto which the washer 12 is press fit with an interference fit to securely attach it to the shank, and a cylindrical shoulder portion 36 desirably with a planar face 38 desirably perpendicular to the axis 28 of the shank and with a peripheral diameter greater than the diameter of the hole 16 through the washer. The shoulder 36 axially spaces the washer from the head 22 and the shoulder face 38 disposes both planar parallel faces 40 of the washer substantially perpendicular to the axis 28 of the shank and substantially parallel to the inner face 26 of the head 22.

The body 14 may be made from a preform 14' with a shank or pin 20' with the head 22 on one end and the adjacent shoulder 36 with its face 38. The shank 20' may be also formed with the pilot portion 30, and a cylindrical portion 42 which may have a diameter larger than that of the pilot portion and somewhat smaller than the inside diameter of the hole 16 through the washer 14 so that the washer may slide over the cylindrical portion and be press fit onto the protuberances 34 and into engagement with the shoulder face 38.

Figure 3:
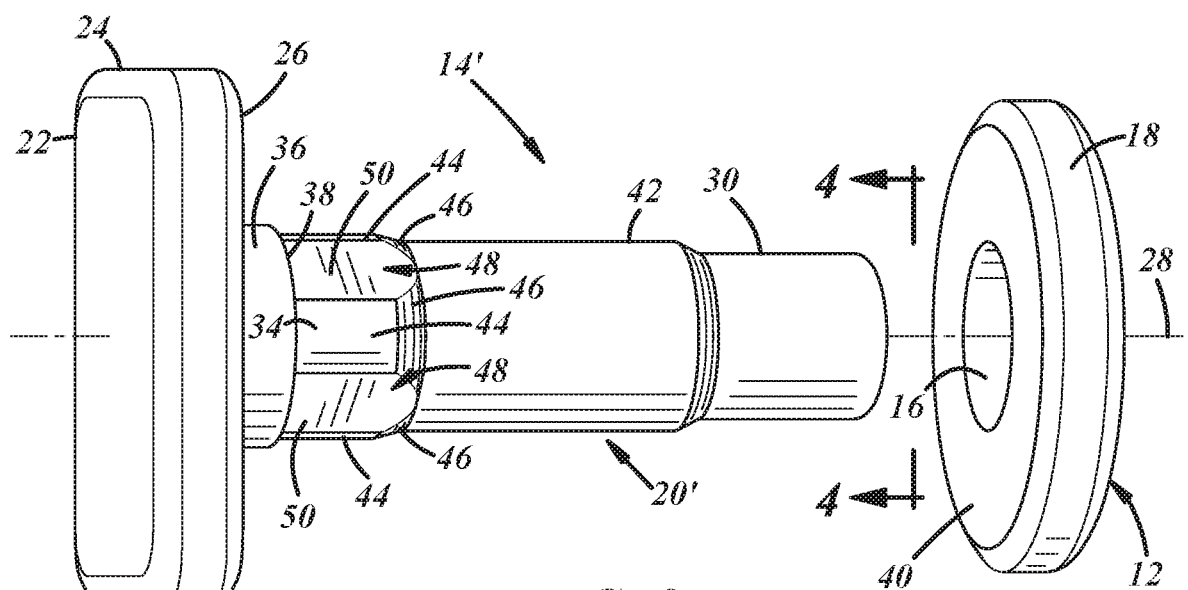
FIG. 3 is a perspective exploded view of a preform of the body and the washer.
Figure 4:
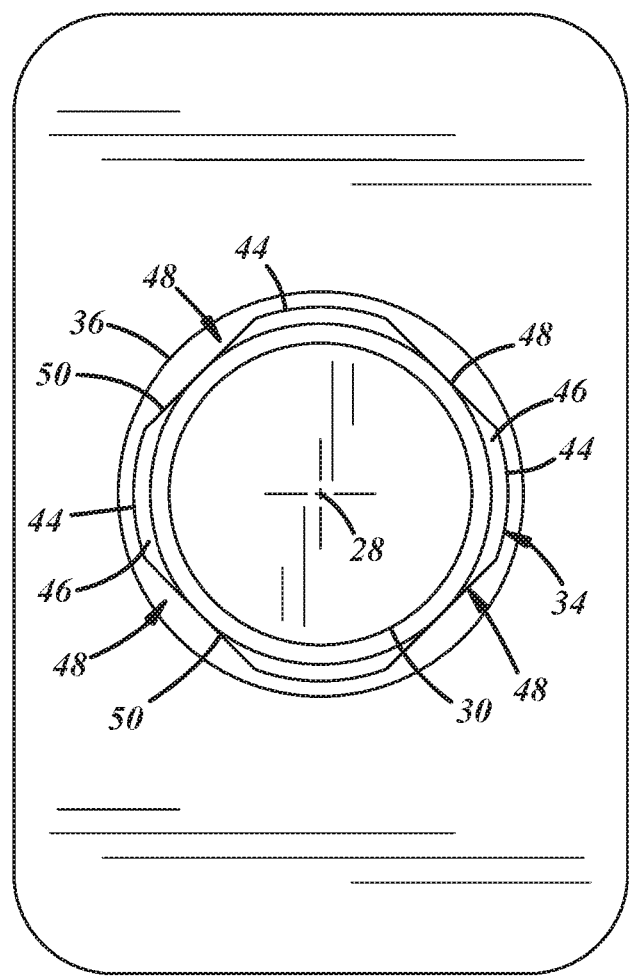
FIG. 4 is an end view of the preform of the body taken on line 4-4 of FIG. 3.
Figure 6:
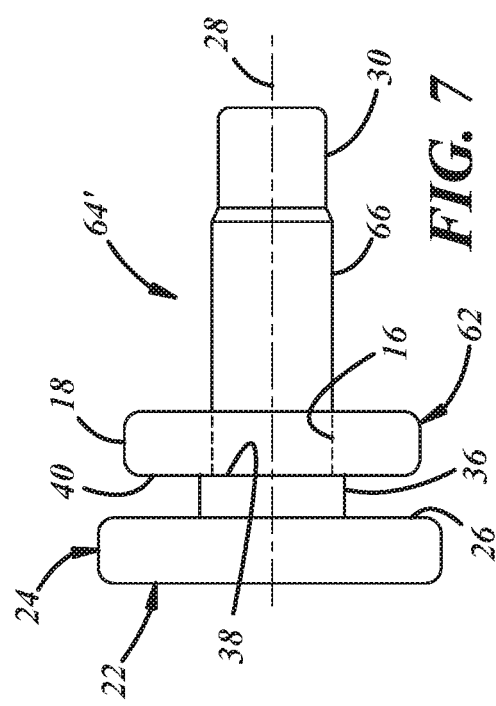
FIG. 6 is a side view of a fastener assembly embodying this invention with a modified form of a body with a washer shown in section and fixed to the body.

As shown in FIGS. 3 & 4, the preform 14' may have four equally circumferentially spaced apart ribs or protuberances 34 desirably each with an axially and circumferentially extending arcuate and desirably cylindrical surface 44 with a radius somewhat greater than the radius of hole 16 of the washer 12 to provide in assembly a press fit or interference fit between the surface of the hole 16 of the washer and the protuberances 34 to fix or securely fasten the washer on the body 14 with its adjacent face 40 bearing on the shoulder face 38. To facilitate press fitting of the washer on the protuberances, each protuberance may have a leading ramp or tapered portion 46 which extends axially, and radially inwardly toward and desirably merges into the surface of the cylindrical portion 42. Thus, the leading portion of the ramp has a radius less than the radius of the cylindrical hole 16 in the washer. Collectively, these tapered surfaces or ramps 46 align the hole 16 of the washer with the collective cylindrical surfaces 44 of the protuberances to facilitate press fitting of the washer 12 onto these cylindrical surfaces of the protuberances. The cylindrical surfaces 44 of all of the protuberances collectively may have a common axis which desirably is coaxial with the axis 28 of the preform 14' and body 14 of the fastener assembly 10.

A recess 48 may be provided between each of the circumferentially spaced apart protuberances 34. Each recess 48 may have a substantially planar surface 50 which may extend parallel to the axis 28 and at one end may be tangent with the adjacent cylindrical surface 42. It is believed that when the washer 12 is press fit over the protuberances 34 some of the material thereof is displaced into the adjacent recesses 48. The spaced apart protuberances 34 with associated recesses are believed to provide a press fit more securely fastening the washer 12 to the body 14 than that which would be obtained if the washer was press fit over a circumferentially continuous cylindrical surface having the same radius as that of the spaced apart surfaces 44 of the protuberances.

Desirably both the washer 12, preform 14' and thus the body 14 are made of a ductile metal such as steel, desirably AISI 1010 or 1020 steel, brass copper, aluminum or stainless steel depending on the intended application or use of the fastener assembly 10. Desirably the washer 14 may be slidably disposed on the cylindrical surface 42 of the preform 14' and then press fit onto the protuberances 34 with its adjacent face 40 bearing on the shoulder face 38 to thereby fix or firmly and permanently secure the washer to the preform 14' and the body 14 so that in assembly the washer cannot rotate relative to the body. Typically, this press fitting also forces the adjacent face 40 of the washer into permanent engagement with the shoulder 36 which precisely controls the spacing between this face 40 of the washer and the adjacent face 26 of the head 22 and disposes this face 40 at the same angle to the axis 28 as the angle of inclination of the shoulder face 38 to the axis 28 which desirably is essentially perpendicular to the axis 28. Desirably the washer may be press fit onto the protuberances 34 before the threads 32 are formed on the preform 14', although if the protuberance cylindrical surfaces 46 are sufficiently radially outward of the maximum or major diameter of the threads 32 to be formed, the washer may be press fit onto the protuberances after the threads 32 are formed on the preform 14'.

Figure 5:
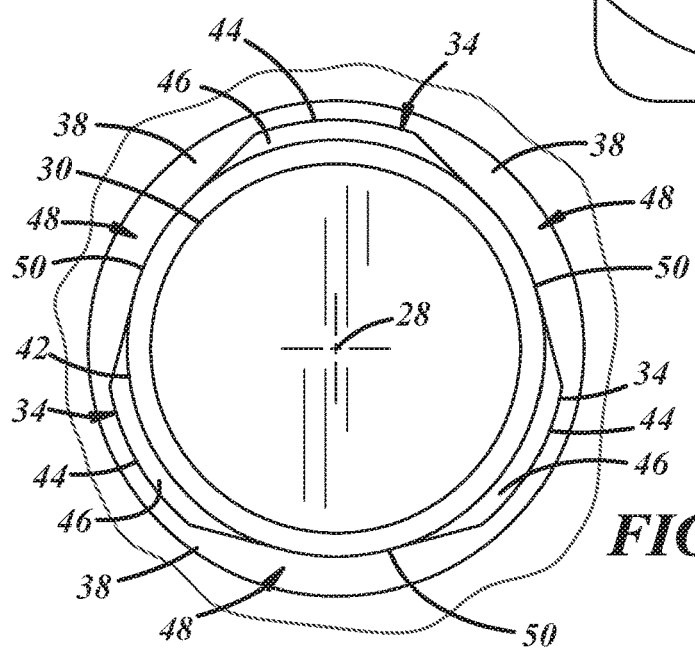
FIG. 5 is an enlarged fragmentary end view of a preform of the body with three protuberances.

As shown in FIG. 5, in some applications it may be desirable to use only three equally circumferentially spaced apart protuberances 34 with recesses 48 between them for the press fit attachment of the washer 12 on the preform 14' and body 14. It is believed to be desirable to use at least three equally circumferentially spaced apart protuberances 34 with recesses 48 between them to center the hole 16 of the washer with respect to the protuberances as the washer is advanced over the ramps or tapered portions 46 and onto the exterior surfaces 44 of the protuberances during press fitting. Desirably the ramp 46 and cylindrical surface 44 of each protuberance is spaced the same radial distance from a common or the same axis which desirably is coincident with the axis 28 of the preform 14' and body 14 of the fastener.

FIGS. 6-9 illustrate another fastener assembly 60 with a different form and method of attachment of a washer 62 to a body 64 of the fastener assembly. The washer 62 may be essentially the same as the washer 12 and have a cylindrical through hole 16, a perimeter 18 with a circular or non-circular periphery as may be desired for a particular application of the fastener assembly and with parallel faces 40 which may be substantially perpendicular to the axis of the through hole or bore 16. These elements and configuration of the washer 62 are the same of those of the washer 12 the description of which is incorporated hereat by reference and thus will not be repeated.

The body 64 may have a shank 66 with an integral head 22 adjacent one end with a non-circular periphery configured for engagement by a component and/or a suitable tool to rotate or hold the fastener assembly 60 when it is being attached to or removed from one or more components, and an inner face 26 that may be substantially planar and may be perpendicular to the longitudinal axis 28 of the body. The shank 66 may have a pilot portion 30 which may be substantially cylindrical with a first diameter and it may merge into a threaded portion 32 with threads having an outside or major diameter greater than that of the pilot portion. The shank 66 may also have a shoulder portion 36 which may be cylindrical and with a face 38 which may be planar and may be disposed substantially perpendicular to the axis 28 of the shank and the body 64. The pilot portion 30, threads 32, shoulder 36 with its face 38, and head 22 may be of substantially the same construction as that described in connection with fastener assembly 10, the description of which is incorporated hereat by reference and thus will not be repeated.

Figure 7:
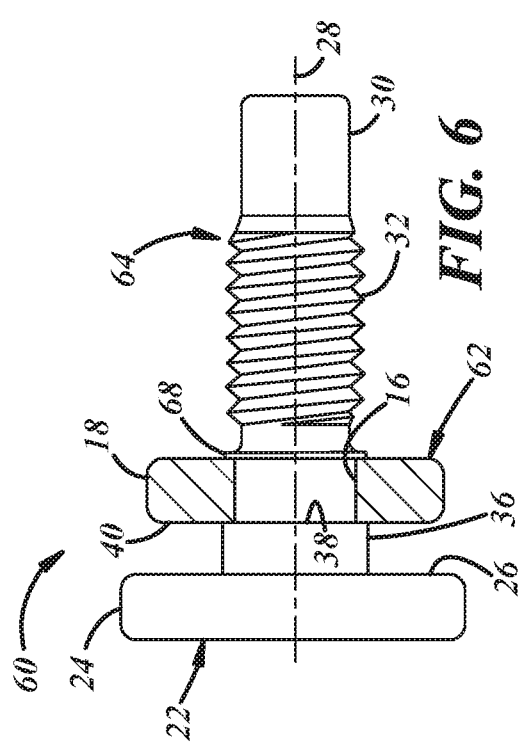
FIG. 7 is a side view of a preform of the modified body of the fastener assembly of FIG. 6 with a washer slidably received thereon before forming threads thereon and fixing the washer thereto.
Figure 9:
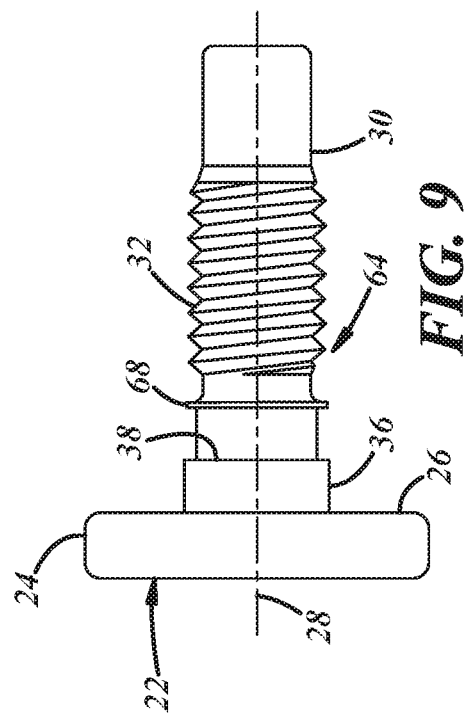
FIG. 9 is a side view of the fastener assembly of FIG. 6 with the washer removed to more clearly illustrate a ring fixing the washer on the body of the fastener assembly.
Figure 8:
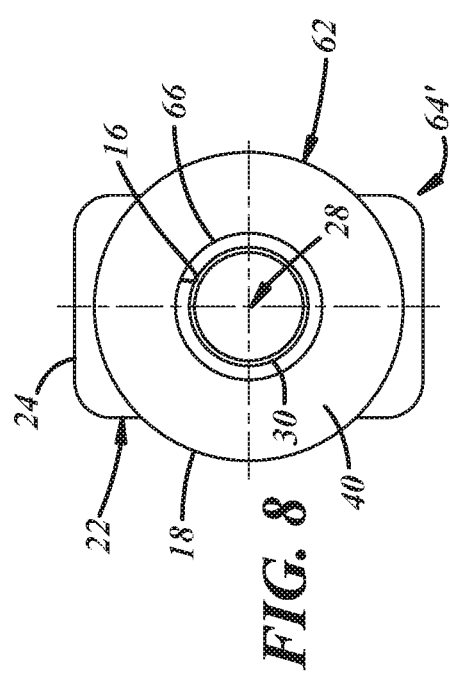
FIG. 8 is an end view of FIG. 7.

As shown in FIGS. 7 and 8 the body 64 may be made from a perform 64' with a head 22, cylindrical shoulder 36 with a shoulder face 38, a cylindrical portion 66 with an outside diameter slightly smaller than the diameter of the cylindrical hole 16 of the washer 62 so that the washer may be readily slidably received on this cylindrical portion and bear on the shoulder face 38 before threads 32 are formed on this cylindrical portion, and the tip or pilot end portion 30, each of which desirably is coaxial with the axis 28. After the washer 62 is slidably received on the cylindrical portion 66 and bearing on the shoulder face 38, it may be fixed or firmly secured to the preform 64' by an integral attachment ring 68. The attachment ring extends radially outwardly of the hole 16 and bears on an immediately adjacent portion of the side wall 40 of the washer and traps the washer between and engaging both the shoulder face 38 and the attachment ring 68 to fix or securely attach the washer to the preform 64' and body 64 so that it does not rotate relative to the body. The ring 68 and threads 32 may be formed sequentially or substantially simultaneously such as by roll forming with suitable dies. Roll forming the attachment ring 68 is believed to increase the diameter of at least a portion of the cylindrical surface 66 within the hole 16 and adjacent the ring into firm engagement with the washer to further securely attach it to the preform 64' and to the body 64. FIG. 9 illustrates the formed integral attachment ring 68 and threads 32 of the fastener assembly 60 with the washer removed for clarity.

In use of the fasteners 10 and 60 a part or component (such as a vehicle trim piece, license plate holder, etc.) may be received over the head 22 and with a portion between the head and the washer 12 or 62, and the body 14 or 64 attached to another one or more components by a nut with complimentary threads engaged with the threads 32 of the body.

The preform 14' and 64' of the body 14 and 64 of the fastener assemblies 10 and 60 respectively may be made by forming processes such as cold heading and the threads 32 may be made by cold roll forming with suitable dies. The washer 12 may be attached to the preform 14' or body 14 by press fitting onto the protrusions 34. The washer 62 may be attached to the preform 62' by roll forming the integral attachment ring 68. Both the ring 68 and the threads 32 may be cold formed by roll forming with suitable dies. Thus, the fastener assemblies 10 and 60 may be very economically mass produced with little to no scrap material, have high-strength for their size, and may be made with small diameter shanks and threads 32 with a major diameter of 0.25 of an inch or less.

The invention claimed is:

1. A fastener assembly comprising
a body having a shank, an integral head adjacent one end of the shank, and an integral shoulder spaced from the head;
a washer with a through hole and the washer received on the shank, bearing on the shoulder and fastened securely to the shank;
the washer and shank are of a ductile metal; and
the shank comprises a plurality of equally circumferentially spaced apart protuberances each disposed adjacent the shoulder and having a peripheral surface with a radius somewhat larger than a radius of the through hole of the washer before the washer is press fit onto the protuberances to attach the washer to the shank.

2. The fastener assembly of claim 1 which also comprises recesses between the protuberances.

3. The fastener assembly of claim 1 wherein the body and the washer are of a ductile metal.

4. The fastener assembly of claim 1 which also comprises threads which were roll formed on the shank.

5. The fastener assembly of claim 1, wherein the shank comprises at least three equally circumferentially spaced apart protuberances adjacent the shoulder and each having an outer surface extending generally axially of the shank, recesses between the protuberances, and the washer is press fit on the protuberances.

6. The fastener assembly of claim 5, wherein an end of each protuberance distal from the shoulder merges into a tapered surface inclined inwardly toward the axis of the shank and terminates with a radius smaller than the radius of the hole through the washer.

7. The fastener assembly of claim 5 wherein the outer surface of each protuberance is substantially arcuate.

8. The fastener assembly of claim 1 wherein the head has a non-circular configuration for engagement with a component to be retained by the fastener assembly.

9. The fastener of claim 1 wherein the head has a non-circular feature therein configured for engagement with a tool to rotate or hold from rotation the fastener assembly.

10. The fastener assembly of claim 1 wherein a periphery of the washer is circular.

11. A method of making a fastener assembly comprising:
cold heading a body with a shank, an integral head adjacent one end, an integral shoulder portion with a face axially spaced from the head, a plurality of equally circumferentially spaced apart protuberances adjacent the shoulder and each with an outer surface disposed radially inward of the periphery of the shoulder, and recesses between the protuberances;
providing a washer with a through hole;
press fitting with an interference fit the washer onto the protuberances and into engagement with the face of the shoulder to fasten securely the washer on the body; and
cold roll forming threads on the shank of the body.

12. A method of making a fastener assembly comprising:
cold forming a body with a shank, an integral head adjacent one end of the shank, a shoulder portion and a cylindrical portion with an outer surface radially inside the outer periphery of the shoulder;
providing a washer with a through hole;
slidably disposing the washer on the cylindrical portion and engaging the face of the shoulder;
cold roll forming on the cylindrical portion a ring spaced from the shoulder and bearing on and overlapping an adjacent portion of the washer to fasten securely the washer to the shank so that the washer does not rotate relative to the shank and bears on the face of the shoulder; and
cold roll forming threads on the shank of the body.

13. The method of claim 12 wherein the ring and the threads are cold rolled substantially simultaneously.

14. The method of claim 12 wherein the ring and the threads are cold roll formed by the same dies.

15. A fastener assembly comprising:
a body of metal having a shank, an integral head adjacent one end of the shank, and an integral shoulder spaced from the head; and
a washer of metal with a through hole and the washer received on the shank, bearing on the shoulder and fastened securely to the shank so that the washer does not rotate relative to the shank by an interference press fit of the washer on a plurality of circumferentially spaced apart protrusions integral with the shank or by a ring integral with the shank, spaced from the shoulder and bearing on and overlapped with an adjacent face of the washer.

16. The fastener assembly of claim 15, wherein the integral ring on the shank is spaced from the shoulder and bearing on the washer and with an outside diameter greater than the diameter of the hole through the washer and by which the ring fastens securely the washer to the shank.

17. The fastener assembly of claim 16, wherein the ring is roll formed on the shank.

18. The fastener assembly of claim 15, wherein the ring and threads on the shank were cold formed.

19. The fastener assembly of claim 15, wherein the body is of a ductile metal and the head, ring and threads were cold formed on the shank.

20. The fastener assembly of claim 15 wherein the periphery of the head is non-circular and configured for engagement with a component to be retained by the fastener.

* * * * *